Oct. 20, 1959 R. A. SALICK 2,909,356
CHRISTMAS-TREE SUPPORT HAVING TREE TOP FASTENING MEANS
Filed Aug. 15, 1956
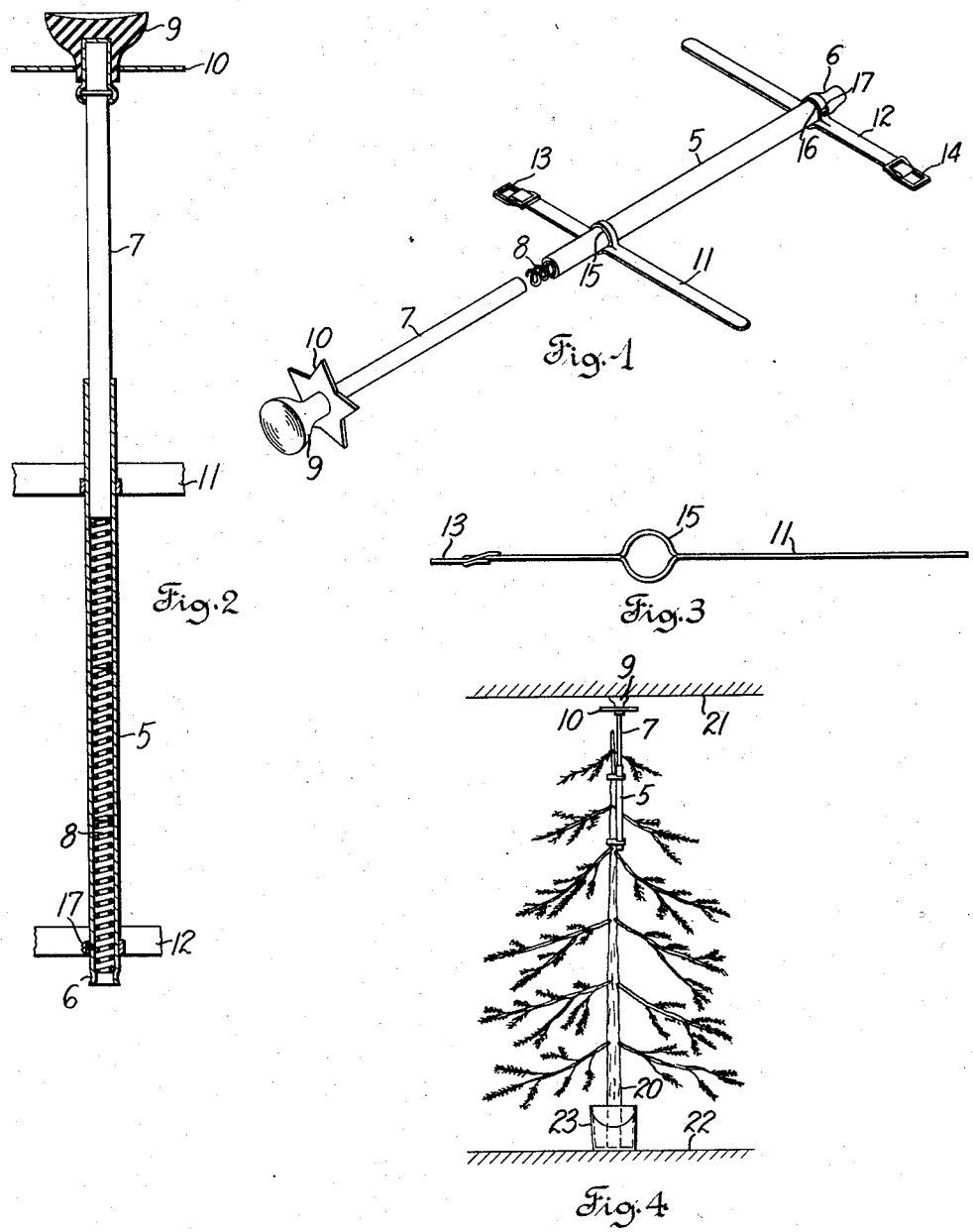
Inventor
Ralph A. Salick
by John Stevens Lieb
Attorney 2,909,356

CHRISTMAS-TREE SUPPORT HAVING TREE TOP FASTENING MEANS

Ralph A. Salick, Hartland, Wis.

Application August 15, 1956, Serial No. 604,166

6 Claims. (Cl. 248—361)

This invention relates to an improved support for a Christmas tree.

Heretofore, Christmas-tree supports have comprised floor stands which are interposed between the base of a tree and the floor. They grip the base of the tree and hold it erect. Since these floor stands are not generally fastened to the floor but merely rest upon it, it is relatively easy to tip over a tree which is mounted in such a stand by inclining the tree until the center of mass of the combined tree and stand lies vertically outside the stand's periphery. Gravity will then pull the tree over. Since a tree in falling may strike and injure people, or damage Christmas tree ornaments and surrounding objects, or even start a fire through crushing and short-circuiting the strings of electric lights carried by the tree, it is advantageous to support the tree so that it cannot be tipped over.

The present invention proposes to overcome the disadvantages of floor stands for supporting Christmas trees by providing an improved tree support which will be interposed between a tree and the ceiling and which will grip the tree at the top thereof rather than at the base thereof and provide means whereby the tree may be rotated about a vertical axis through its trunk.

The Christmas-tree support of the present invention comprises a fixed tubular member fastenable to the top portion of the trunk of a Christmas tree as by straps encircling the trunk. Inserted in the fixed tubular member in telescopic relation thereto is a movable member equipped at its distal end with a ceiling-fastenable means such as a suction cup which is rotatable relative to the tubular member. The suction cup is urged into suctional engagement with the ceiling by means of a compression coil spring which is operably disposed in the fixed tubular member for biasing the cup by biasing the movable member. However, the spring may be omitted, in which case, the suction cup once suctionally engaged with the ceiling will hold the movable member securely to the ceiling.

The present invention, therefore, proffers an improved Christmas-tree support which when operatively combined with the top of a Christmas tree will coact directly with the ceiling and indirectly through the tree with the floor to hold the tree securely in a vertical and nontipable position for rotation about a vertical axis through the trunk of the tree.

An object of the invention, then, is to provide an improved Christmas-tree support which when combined with a tree and fastened to the ceiling will prevent the tree from being tipped over yet permit it to be readily rotated about its vertical axis.

A further object of the invention is to provide an improved Christmas-tree support for interpositioning between a tree and the ceiling which support can be assembled to and disassembled from a tree more quickly than prior art floor stands.

A further object of the invention is to provide an improved Christmas-tree support which has tree top fastening means adjustable for trees of various height, diameters, and branch spacing.

A further object of the invention is to provide an improved Christmas-tree support which is adjustable so that it may be interposed in tree supporting relation between trees of various heights and ceilings of various heights.

A further object of the invention is to provide an improved Christmas-tree support fastenable to a ceiling which is simple to operate, economical to construct, and occupies a fraction of the space taken up by a floor stand. Another object of the invention is to provide an improved Christmas-tree support which will bias a tree against the floor and ceiling to securely hold it in a vertical position.

Other objects and advantages will be apparent from the following description and the drawings of a preferred embodiment of the invention. In the drawings:

Fig. 1 is an exploded view of one species of Christmas-tree support embodying this invention;

Fig. 2 is a vertical longitudinal section taken through the assembled support of Fig. 1, the tree-fastening means being shown in fragment in the drawing;

Fig. 3 is an edge view of one of the tree-fastening means shown in Fig. 1;

Fig. 4 is an elevation view of the Christmas-tree support of this invention operably attached to the upper trunk of a Christmas tree in tree-supporting position between a ceiling and floor.

As shown in Figs. 1 and 2, a Christmas-tree support embodying this invention comprises a fixed rigid tubular member 5, open at one end. The other end of member 5 may be open, or partially closed, as shown in the drawings, by a crimp 6 or other suitable means. Slidably positioned for axial movement within tubular member 5 and rotatable movement relative thereto is one end of a movable rigid member 7 having an outside diameter less than the inside diameter of member 6. Interposed between crimp 6 in member 5 and the one end of member 7 is a compression coil spring 8 which may be made in one piece or in separable pieces. If member 5 is not closed as by crimp 6 the end of spring 8 which would coact with crimp 6 may be fastened to member 5 by any suitable fastening means, as by a screw, not shown. Spring 8 has a diameter less than the inside diameter of tubular member 5 so that it can be totally enclosed within member 5. Spring 8 biases member 7 axially away from crimp 6 in member 5. Spring 8 may be omitted, however, in which case member 7 is free to telescope within member 5.

A suction cup 9 or other ceiling-fastenable means having a surface suitable for attachment to a ceiling or the like is connected to the other end of movable member 7. Suction cup 9 may be rotatably fastened to member 7 if so desired, in which case member 7 may or may not be rotatable relative to member 5.

A star 10 or other decorative means for concealing the cup 9 from the view of persons standing near the base of the tree is mounted over the base of cup 9, but may be mounted, if desired, directly on movable member 7.

Tree-fastening means are provided for securing the tree support to the upper portion of the trunk of a Christmas tree and may comprise straps 11, 12 which are flexible or bendable and may be made of a metallic or nonmetallic material. The straps 11, 12 have tree engaging surfaces which are positioned generally at right angles to the engaging surface of the suction cup 9. Straps 11, 12 are further provided with buckles 13, 14 through which the free ends of the straps pass. Straps 11, 12 have respective slots 15, 16 intermediate their ends through which tubular member 5 passes, the portions of the straps surrounding member 5 being formed to follow the contour of the outer surface of the member 5. Strap 12 is fixed securely to member 5 adjacent crimp 6, by a screw 17 threaded into a complementary threaded hole in member 5. When crimp 6 is omitted screw 17 may be used to support spring 8. Strap 11, on the other hand, is free to slide axially along member 5 to afford a variety of axial spacings between straps 11 and 12 in response to variations in the vertical spacing between the uppermost branches of the Christmas tree.

The Christmas-tree support hereinbefore described functions in the following manner:

As shown in the embodiment of Fig. 4, the tree support is interposed between the ceiling and the top portion of the trunk of a Christmas tree 20. The suction cup 9 is pressed against the ceiling 21 in frictional surface-engaging relation therewith, movable member 7 being partially telescoped within member 5 so as to substantially compress spring 8. Strap 11 is adjustably spaced from strap 12 on tubular member 5 in conformance with the spacing of the branches in the uppermost portion of the tree 20, and the two straps 11, 12 are fastened around the trunk of the tree presenting their tree-engaging surfaces thereto to securely hold member 5 against the tree 20. In this position spring 8 biases member 7 upward away from crimp 6 to press suction cup 9 firmly against the ceiling and press the base of the tree 20 firmly against the floor 22, or if a bucket or other container 23 is interposed between the base of the tree and the floor 22, against the base of the bucket 23. In such position the tree is rotatable about a vertical axis through its trunk.

When spring 8 is omitted, suction cup 9 is suctionally engaged with the ceiling, movable member 7 being partially telescoped within member 5, the two members forming together a nonbendable support for the tree which is biased against the floor by its own weight.

Although straps 11, 12 are shown as the preferred embodiment of tree-fastening means, the invention is not limited to the use of straps but may incorporate other equivalent means for fastening the support to the tree.

Although but one embodiment of the present invention has been illustrated herein and three embodiments described herein, it will be apparent to one skilled in the art that various changes and modifications, singly or collectively may be made therein without departing from the essence of the invention or the scope of the appended claims.

What is claimed is:

1. A Christmas-tree support interposable between a Christmas tree and the ceiling of a room for wedging the tree in a rotatable standing position between the floor and ceiling of the room, said support comprising a fixed rigid tubular member, a movable rigid member slidable within said tubular member and rotatable relative thereto, a coil spring contained in said tubular member and coacting therewith and with one end of said movable member for biasing the distal ends of said members away from each other, a suction cup mounted on the other end of said movable member and presenting an engaging suction surface generally at right angles to the longitudinal axis of said movable member, and a pair of tree-embracing flexible straps, each strap having a longitudinal slot between its ends through which said tubular member passes to engage with portions of the opposed surfaces of said strap, said portions of said strap conforming in contour to the outer surface of said tubular member, each of said straps further having tree-embracing surfaces generally at right angles to said suction surface of said cup, one of said straps being fixedly secured to said tubular member and the other of said straps being slidable axially along said tubular member to vary the axial spacing between said straps.

2. A Christmas-tree support interposable between a Christmas tree and the ceiling of a room for wedging the tree in a rotatable standing position between the floor and ceiling of the room, said support comprising a fixed rigid tubular member at least partially closed at one end, a movable rigid member slidable within said tubular member and rotatable relative thereto, a coil spring contained in said tubular member and interposed between said closed end of said tubular member and one end of said movable member for biasing the distal ends of said members away from each other, a suction cup mounted on the other end of said movable member and presenting an engaging suction surface generally at right angles to the longitudinal axis of said movable member, concealing means mounted on said movable member for hiding said cup from the view of persons standing on the floor near the base of said tree, and a pair of tree-embracing flexible straps having longitudinally extending slots between their ends through which said tubular member passes, said straps presenting tube engaging surfaces conforming in contour to the outer surface of said tubular member and tree-embracing surfaces generally at right angles to said suction surface of said cup, one of said straps being fixedly secured to said tubular member and the other of said straps being slidable axially along said tubular member to vary the axial spacing between said straps.

3. A Christmas-tree support interposable between the tree and the ceiling of a room for wedging the tree in rotatable standing position between the ceiling and floor of the room, said support comprising a fixed rigid tubular member, a movable rigid member slidable within said tubular member, a coil spring contained in said tubular member and coacting therewith and with one end of said movable member for biasing the distal ends of said members away from each other, ceiling-fastenable means responsive to pressure only for retaining said means in nonslidable frictional engagement with the ceiling, said means being mounted on the other end of said movable member and rotatable relative to said tubular member, and a pair of tree-fastening means mounted on said tubular member in axially spaced relation, one of said tree-fastening means being axially movable relative to the other of said tree-fastening means.

4. A Christmas-tree support interposable between the tree and the ceiling of a room for wedging the tree in a rotatable standing position between the ceiling and floor of the room, said support comprising a fixed rigid tubular member, a movable rigid member slidable within said tubular member and rotatable relative thereto, a suction cup mounted on the other end of said movable member and presenting an engaging suction surface generally at right angles to the longitudinal axis of said movable member, and a pair of tree-embracing flexible straps, each strap having a longitudinal slot between its ends through which said tubular member passes to engage with portions of the opposed surfaces of said strap, said portions of said strap conforming in contour to the outer surface of said tubular member, each of said straps further having tree-embracing surfaces generally at right angles to said suction surface of said cup, one of said straps being fixed secured to said tubular member and the other of said straps being slidable axially along said tubular member to vary the axial spacing between said straps.

5. A Christmas-tree support for wedging a Christmas tree between a floor and a ceiling in rotatable relation thereto comprising a fixed rigid tubular member at least partially closed at one end, a movable rigid member slidable within said tubular member and rotatable relative thereto, a suction cup mounted on the other end of said movable member and presenting an engaging suction surface generally at right angles to the longitudinal axis of said movable member, concealing means mounted on said movable member for hiding said cup from the view of persons standing on the floor near the base of said tree, and a pair of tree-embracing flexible straps having longitudinally extending slots between their ends through which said tubular member passes, said straps presenting tube engaging surfaces conforming in contour to the outer surface of said tubular member and tree-embracing surfaces generally at right angles to said suction surface of said cup, one of said straps being fixedly secured to said tubular member and the other of said straps being slidable axially along said tubular member to vary the axial spacing between said straps.

6. A supporting device for wedging a Christmas tree in a rotatable standing position between a ceiling and a floor, said device comprising a pair of relatively movable members adapted to be alignable substantially with the vertical axis of the tree and adapted to be interposed between the tree and the ceiling, one of said members being slidable and rotatable relative to the other of said members when said device is in tree-supporting position, ceiling attaching means secured to one of said members and responsive to pressure only for retaining said means in nonslidable engagement with the ceiling, tree fastening means carried by the other of said members for fastening the device to the tree, one part of said tree fastening means being axially movable relative to another part of said tree fastening means, and resilient means associated with said members for biasing said members apart.

References Cited in the file of this patent

UNITED STATES PATENTS

| | | |
|---|---|---|
| 401,422 | Ellicott | Apr. 16, 1889 |
| 1,105,519 | Jessup | July 28, 1914 |
| 1,548,053 | Mead | Aug. 4, 1925 |
| 1,639,551 | Booth | Aug. 16, 1927 |
| 1,737,237 | Helling | Nov. 26, 1929 |
| 2,332,240 | Lavalley | Oct. 19, 1943 |
| 2,669,729 | Stader | Feb. 23, 1954 |
| 2,733,885 | Brown et al. | Feb. 7, 1956 |